US007302070B2

(12) United States Patent
Blamey et al.

(10) Patent No.: US 7,302,070 B2
(45) Date of Patent: Nov. 27, 2007

(54) OSCILLATION DETECTION

(75) Inventors: Peter John Blamey, South Yarra (AU); Benjamin John Smith, Balwyn (AU)

(73) Assignee: Dynamic Hearing Pty Ltd, Richmond (AU)

( * ) Notice: Subject to any disclaimer, the term of this patent is extended or adjusted under 35 U.S.C. 154(b) by 0 days.

(21) Appl. No.: 10/557,533

(22) PCT Filed: May 26, 2004

(86) PCT No.: PCT/AU2004/000701

§ 371 (c)(1),
(2), (4) Date: Jul. 24, 2006

(87) PCT Pub. No.: WO2004/105429

PCT Pub. Date: Dec. 2, 2004

(65) Prior Publication Data

US 2007/0063780 A1 Mar. 22, 2007

(51) Int. Cl.
*H04R 25/00* (2006.01)
*H04B 15/00* (2006.01)

(52) U.S. Cl. ........................................ 381/318; 381/93

(58) Field of Classification Search ................ 381/312, 381/317, 318, 83, 93; 379/387, 392
See application file for complete search history.

(56) References Cited

U.S. PATENT DOCUMENTS 4,449,237 A * 5/1984 Stepp et al. .................. 381/93
6,404,895 B1 * 6/2002 Weidner ..................... 381/318
6,434,246 B1 8/2002 Kates et al.
6,498,858 B2 12/2002 Kates
6,587,559 B1 * 7/2003 Bartkowiak ................. 379/386
6,914,979 B2 * 7/2005 Kurtz et al. ................ 379/386
2004/0190731 A1 * 9/2004 Luo et al. ..................... 381/93

* cited by examiner

*Primary Examiner*—Sinh Tran
*Assistant Examiner*—Walter F Briney, III
(74) *Attorney, Agent, or Firm*—Knoble Yoshida & Dunleavy, LLC

(57) ABSTRACT

The invention relates to oscillation detection and, more particularly, concerns a method and apparatus for identifying oscillation in a signal due to feedback, permitting appropriate action to be taken to suppress the oscillation. The method involves using an FFT device or similar to convert a signal at each of a series of successive time windows into the frequency domain, calculating, for each of a plurality of frequency bands, the change in signal phase from a time window to a subsequent time window, and comparing, for some or all of said frequency bands, the results of the calculation step to one or more defined criteria to provide a measure of whether oscillation due to feedback is present in the signal. For additional discrimination, the change in signal amplitude from a time window to a subsequent time window may also be calculated for each of the frequency bands, and the result compared with one or more further defined criteria. The invention has particular application in hearing aid devices.

26 Claims, 4 Drawing Sheets

OSCILLATION DETECTION

CROSS-REFERENCE TO RELATED APPLICATIONS

The present application is a §371 continuation of International Patent Application No. PCT/AU2004/000701, filed on May 26, 2004, which, in turn, claims the benefit of U.S. patent application Ser. No. 10/445,462, filed May 27, 2003, currently pending under 35 U.S.C. § 120.

FIELD OF THE INVENTION

The present invention relates to oscillation detection and, more particularly, concerns a method and apparatus for identifying oscillation in a signal due to feedback. The present invention may be used in conjunction with the method and apparatus for suppressing oscillation in a signal described in applicant's copending international application entitled 'Oscillation Suppression', based on Australian provisional patent application AU-2003902587.

BACKGROUND OF THE INVENTION

In this specification, where a document, act or item of knowledge is referred to or discussed, this reference or discussion is not an admission that the document, act or item of knowledge or any combination thereof was, at the priority date, part of common general knowledge, or known to be relevant to an attempt to solve any problem with which this specification is concerned.

Acoustic amplifiers are used in many common applications such as telephones, radios, headsets, hearing aids, and public address systems. Typically, such an application comprises a microphone or other input transducer to pick up sounds and convert them into an electrical signal, an electronic amplifier to increase the power of the electrical signal, and a speaker or other output transducer to convert the amplified electrical signal back into sound.

If the input and output transducers are close enough, the output acoustic signal may be picked up by the input transducer and fed back into the amplifier with a delay, the delay being the time taken for the sound to travel from the output transducer to the input transducer (plus any delay due to the electrical processing of the signal). This is 'acoustic feedback'. Electrical feedback can also occur if the electrical signal at the output is coupled back to the input, for example by inductive or capacitive coupling. Further, mechanical feedback can also occur if vibrations are transmitted from the output transducer to the input transducer via the body or case of the amplification system.

Under feedback conditions, the device can then become unstable and the components begin to ring. The ringing then self-reinforces and increases in intensity to drive the components into saturation. FIG. 1 illustrates a feedback loop, showing diagrammatically the components in an acoustic amplifier circuit, namely microphone 1, amplifier 2 and speaker 3, with feedback loop 4 representing the output signal feeding back to the input transducer.

All forms of feedback may result in instability or oscillation of the output signal from the amplifier under certain conditions. Oscillation and instability are undesirable because they distort the signals being amplified and can result in very loud unpleasant sounds. In the case of hearing aids, this can lead to problems both for the wearer and for those around. The conditions for oscillation are that the total gain around the loop must be greater than 1, so that the signal is fed back into the system with a greater intensity each time, and the total delay around the loop must be a whole number of periods of the oscillation frequency, so that the input and output signals add constructively.

Equivalently, the total phase change around the loop must be a multiple of 2π radians for the oscillation frequency. These criteria are set out in equations 1 to 3 below.

| | |
|---|---|
| Loop Gain > 1 | (eq. 1) |
| Loop Delay = N × period | (eq. 2) |
| Loop Phase Change = 2Nπ radians | (eq. 3) |

(where N is a positive integer)

Any electronic system containing a microphone and speaker in close proximity may suffer from acoustic feedback. In hearing aids, this often results in the wearer experiencing unpleasant audible effects such as loud whistling tones at certain frequencies, usually high frequencies.

The traditional procedure for increasing the stability of a hearing aid is to reduce the gain at high frequencies, as suggested in, for example, U.S. Pat. No. 4,689,818. This may be done by setting the maximum gain value for each frequency, or automatic high frequency (HF) gain roll-off may be used. Controlling feedback by modifying the system frequency response, however, means that the desired high-frequency response of the instrument must be sacrificed in order to maintain stability.

Efforts have been undertaken to reduce the susceptibility of hearing aids to feedback oscillation by improving the fit and insulating properties of the ear mould. Efforts have also been undertaken from an electrical standpoint, from attenuation and notch filtering, as disclosed in U.S. Pat. No. 4,088,835, to estimation and subtraction of the feedback signal, as disclosed in U.S. Pat. No. 5,016,280, to frequency shifting or delaying the signal, as disclosed in U.S. Pat. No. 5,091,952. Many different approaches to an electrical solution with continuous monitoring of the feedback path have been documented in the relevant literature.

A technique which has been used to suppress feedback in public address systems is a frequency shift, in which the input signal is altered by a few Hertz prior to being output at the receiver. This approach has not been particularly successful in hearing aids because a large frequency shift is required to achieve a significant increase in gain. In hearing aids, the distance between microphone and receiver is much smaller than in public address systems, and thus a feedback signal with only a small frequency shift may still be relatively closely in phase with the input.

Signal phase can also be altered by using a time-varying delay[1]. While this can provide 1-2 dB of additional useable gain, it can also result in an audible 'warbling' effect. All pass filters have also been used to modify the phase response of the feedback loop, but it can be difficult to achieve satisfactory phase at all frequencies. Methods have been proposed to push danger regions in the phase response to frequencies outside the primary audio range where suppression can be applied without loss of sound quality [2] [3]. These techniques still assume that the feedback path is constant however. The most common gain altering approaches attempt to reduce the system gain only in narrow bands where feedback is likely to occur. This has been attempted with a variety of notch filter implementations [1] [4] [5]. Adaptive notch filtering has allowed 3-5 dB of additional useable gain. Two of the biggest problems with notch filtering techniques have been the inability to accurately track the variations in the feedback path with a narrow band, and the effects on normal spectral content with a broader band. In addition, the notch filter can actually contribute an additional phase change to the loop and shift the frequency of oscillation as soon as it is applied.

Substantial increases in useable gain have been achieved by inserting an additional feedback path, based on an estimation of the real feedback path, but 180 degrees out of phase. Early adaptive implementations of such systems performed continuous estimation of the feedback path by inserting noise signals with appropriate statistical properties at the receiver and correlating the output with the input at the microphone[1] [6]. These reported up to 10 dB of additional useable gain[7] but, since the noise 'test' signals were audible and unpleasant for most wearers, this particular technique never became particularly widespread.

More recent feedback cancellation systems of this type rely on sounds in the environment to perform their correlation [8]. To avoid artefacts and incorrect suppression of speech however, the estimation time has to be longer than in systems using unnatural sounds to perform correlation. This means that sudden changes in the feedback path can result in several seconds of whistling before successful cancellation occurs. If implemented in conjunction with another technique to handle sudden changes, this approach can allow at least 10 dB of additional useable gain [9]. The benefits and limitations of such systems are discussed in [10].

Nearly all of the techniques discussed in the preceding require some knowledge of the frequency of oscillation. However, as a result of the nature of direct and multiple reflected acoustical paths between microphone and speaker (or the changing acoustic properties of the ear/ear mould/hearing aid coupling with regard to hearing aids) the frequency of acoustic feedback is unpredictable and may extend over a substantial portion of the audio frequency spectrum (between 20 and 20,000 Hz). As a result, it is desirable to have a circuit that can quickly identify an oscillation and its frequency. U.S. Pat. Nos. 4,232,192 and 4,079,199 propose systems using a phase locked loop (PLL) adapted to recognize an oscillation when it occurs. However, when the input signal falls off, a PLL tends to become unstable and to drift. The result of the drift is an undesirable periodic, acoustic noise signal.

U.S. Pat. No. 4,845,757 describes another oscillation recognition circuit. This circuit detects oscillations by looking for long-lasting alternating voltages having relatively large amplitude and relatively high frequency. This is problematic in many applications because it means that the signal may contain feedback oscillations for some time before they are identified by such a circuit.

SUMMARY OF THE INVENTION

The invention provides, in accordance with a first aspect, a method of identifying oscillation in a signal due to feedback, the method comprising:

- converting the signal at each of a series of successive time windows into the frequency domain;
- calculating for each of a plurality of frequency bands the change in signal phase from a time window to a subsequent time window; and
- comparing, for some or all of said frequency bands, the results of the calculation step to one or more defined criteria to provide a measure of whether oscillation due to feedback is present in the signal.

This affords a technique for automatically monitoring whether the change in phase over time in a frequency band is sufficiently constant to indicate the presence of an oscillation in the signal. The successive time windows represent time intervals selected for desired performance, and are preferably of 1-100 ms duration. The windows may be discrete, or successive such windows may overlap.

Preferably, the method further comprises calculating, for some or all of said frequency bands, the change in signal amplitude from a time window to a subsequent time window, and comparing the result of the further calculation step to one or more further defined criteria, to provide a further measure as to whether oscillation due to feedback is present in the signal. This calculation can be used to provide an additional level of discrimination.

In one form of this first aspect of the invention, for use in a system involving deriving gain values for said frequency bands in accordance with a specified signal processing algorithm, the method may comprise comparing, for some or all of said frequency bands, the derived gain with a prescribed gain limit, in order to provide a further measure as to whether oscillation due to feedback is present in the signal.

The derived gain may be compared with said prescribed gain limit only for frequency bands and in time windows in which said one or more defined or further defined criteria is/are met.

The signal conversion into the frequency domain may be carried out by way of a Fast Fourier Transform technique.

In a preferred form, for each frequency band, for each time window, the signal phase from one or more previous time windows is compared with that from the current time window to calculate a change of phase, and this phase change is then compared with a previous phase change to provide a measure of the change in phase change.

Preferably, the signal phase change is calculated from each time window to the next successive time window, to provide a continuous monitoring of the change in phase change in that frequency band. Alternatively, other approaches may be employed to monitor the phase change over successive time windows, such as a statistical sampling technique.

A counter may be employed, the counter incremented if the value of the change in phase change is within a prescribed limit, the counter being reset if it is not, the measure of whether oscillation due to feedback is present in the signal being provided by the counter reaching a value $M_p$.

If signal amplitude monitoring is employed, the method may further comprise, for each frequency band, for each time window, comparing the amplitude from at least a previous window with that of the current window to calculate a change in amplitude.

A counter may be employed, the counter being incremented if the value of the amplitude change is greater than zero, the counter being reset if it is not, the further measure of whether oscillation due to feedback is present in the signal being provided by the counter reaching a value $M_a$.

The value of $M_p$ and/or $M_a$ may be selected as appropriate, dependent on the specific application and the level of sensitivity required to achieve the desired performance.

In one form of the invention, $M_p$ is equal to $M_a$.

Preferably, on determination that oscillation due to feedback is present in the signal, a selected method for suppressing oscillation is applied to the signal in that frequency band.

The suppression technique employed may comprise adding a random phase to the signal in at least one of said frequency bands for a prescribed period of time.

Alternatively, the suppression technique may be selected from the group of: applying a phase shift; applying a notch filter; subtracting a signal from the input signal; and applying a gain attenuation.

The above-described oscillation detection method may be applied to a feedback management system for a signal processing apparatus incorporating selectively adjustable or settable signal gain values, whereby the comparing, calculating and comparing are carried out as part of a setup phase, in order to set or adjust said gain values.

The invention provides, in accordance with a second aspect, an apparatus for identifying oscillation in a signal in a system having an input transducer and an output transducer, comprising:

- means for converting the signal into the frequency domain;
- means for analysing the converted signal at each of a succession of time windows over a number of frequency bands, to determine the amplitude and phase of the signal in each frequency band;
- means for calculating the change in signal phase for each frequency band from a time window to a subsequent time window; and
- means for comparing the change in phase with one or more defined criteria to provide a measure of whether oscillation is present in the signal.

Preferably, means are included for further calculating, for each of the frequency bands, the change in signal amplitude from one time window to a subsequent time window, and means for comparing the result of the further calculation to one or more further defined criteria, to provide a further measure as to whether oscillation is present in the signal.

The converting means may comprise a Fast Fourier Transform (FFT) unit.

The apparatus may include means for comparing, for each frequency band and for each time window, the signal phase from one or more previous time windows with that from the current window to calculate a change of phase, and means for comparing this phase change with a previous phase change to provide a measure of the change in phase change.

Preferably, the means for comparing is arranged to calculate the signal phase change from each time window to the next successive time window, to provide continuous monitoring of the change in phase change in that frequency band.

In one form of the invention, a counter is included, arranged to be incremented if the value of the change in phase change is within a prescribed limit, and to be reset if it is not, the measure of whether oscillation is present in the signal being provided by the counter reaching a value $M_p$.

If means are included for calculating the change in signal amplitude from one time window to a subsequent time window, this may comprise means for comparing, for each frequency band and for each time window, the amplitude from at least one previous window with that of the current window, to calculate a change in amplitude.

A counter may be arranged to be incremented if the value of the amplitude change is greater than zero, and to be reset if it is not, the further measure of whether oscillation is present in the signal being provided by the counter reaching a value $M_a$.

In a preferred form, the apparatus is provided in combination with a means for suppressing oscillation, the suppressing means arranged to be triggered in accordance with the measure of whether oscillation is present in the signal.

The apparatus may include means for reconverting the signal to a waveform signal to be fed to the output transducer.

The apparatus of the invention may be applied in combination with a system for deriving gain values for said frequency bands in accordance with a specified signal processing algorithm, including means for comparing, for some or all of said frequency bands, the derived gain with a prescribed gain limit, to provide a further measure as to whether oscillation due to feedback is present in the signal.

In this latter form of the invention, means may be included for comparing the derived gain values with said prescribed gain limit only for frequency bands and in time windows in which said one or more defined or further defined criteria is/are met.

In a further form, the invention provides a feedback management system for a signal processing apparatus incorporating selectively adjustable or settable signal gain values, including the above-defined apparatus, the system including means for setting said gain values in accordance with a measure of whether oscillation is present in the signal.

The invention differs from previous techniques because it relies on continuous monitoring of signal phase information as the primary criterion for oscillation detection, thus allowing oscillation conditions to be identified before the amplitude of the signal at a particular frequency reaches an undesirable level, ideally before audible ringing occurs.

Embodiments of the present invention may therefore provide a feedback detection system that continually monitors an input signal and may recognise the presence of an oscillation quickly and accurately.

If feedback is detected, a feedback suppression algorithm can be applied, such as alteration of the feedback loop in a manner that disrupts the feedback oscillation conditions and suppresses the oscillation without significantly affecting the system frequency response.

In the preferred method of carrying out the invention, short samples or windows of the input signal are analysed into a number of frequency bands via a Fast Fourier Transform (FFT), the amplitude and phase of each frequency component is calculated and then checked against the following oscillation criteria:

1. The change in phase from one window to the next is constant within an acceptable small variation for at least $M_p$ successive windows.
2. (Optional) The amplitude of the frequency component is increasing from one window to the next for at least $M_a$ successive windows.

The invention is based on the realisation that if an oscillation is present in a frequency band it will either dominate the band or be attenuated by destructive interference. Thus any band containing an oscillation that is not attenuated will have a reasonably constant change in phase from one window to the next. In addition, any band that is feeding back to the input will experience an increase in amplitude. By monitoring each frequency band with regards to at least the first of these criteria, the technique can be used to identify oscillation, often before the amplitude becomes uncomfortably loud. In addition, by using these two criteria in conjunction the system can avoid misdiagnosing loud sounds or most oscillating musical tones as feedback.

As will be clear from the above, the technique of the invention can involve checks against three different criteria in determining whether oscillation due to feedback is present in the signal; namely the change in signal phase, the change in signal amplitude, and the derived gain value. It should be noted that each of these checks on the signal may be made in some or all of the frequency bands, and that the checks may be applied in any order to the signal in each frequency band. For example, the gain calculation may be made as an initial check in one or more frequency bands, and if the threshold is not met then the phase change calculation need not be carried out in the relevant frequency band(s) for that time window. The order and logic of applying the different criteria in determining whether oscillation due to feedback is present will depend on the particular application of the invention, and/or on the particular conditions of use.

It should be noted that the feedback detection method may be used with any suitable approach to feedback suppression.

BRIEF DESCRIPTION OF THE DRAWINGS

The present invention will become more apparent by describing in detail a preferred non limiting embodiment with reference to the attached drawings, in which.

DETAILED DESCRIPTION OF THE DRAWINGS

Figure 1:
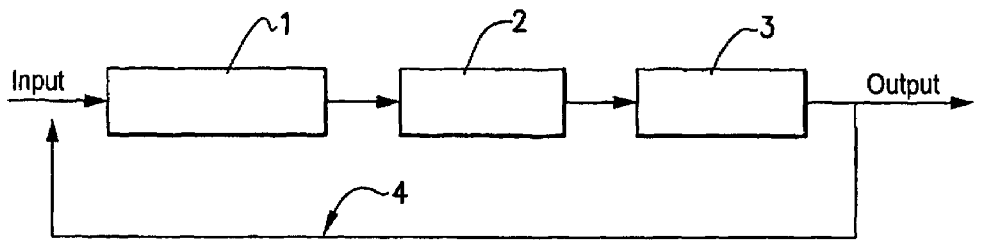
FIG. 1 is a block diagram schematically illustrating a feedback loop.
Figure 2:
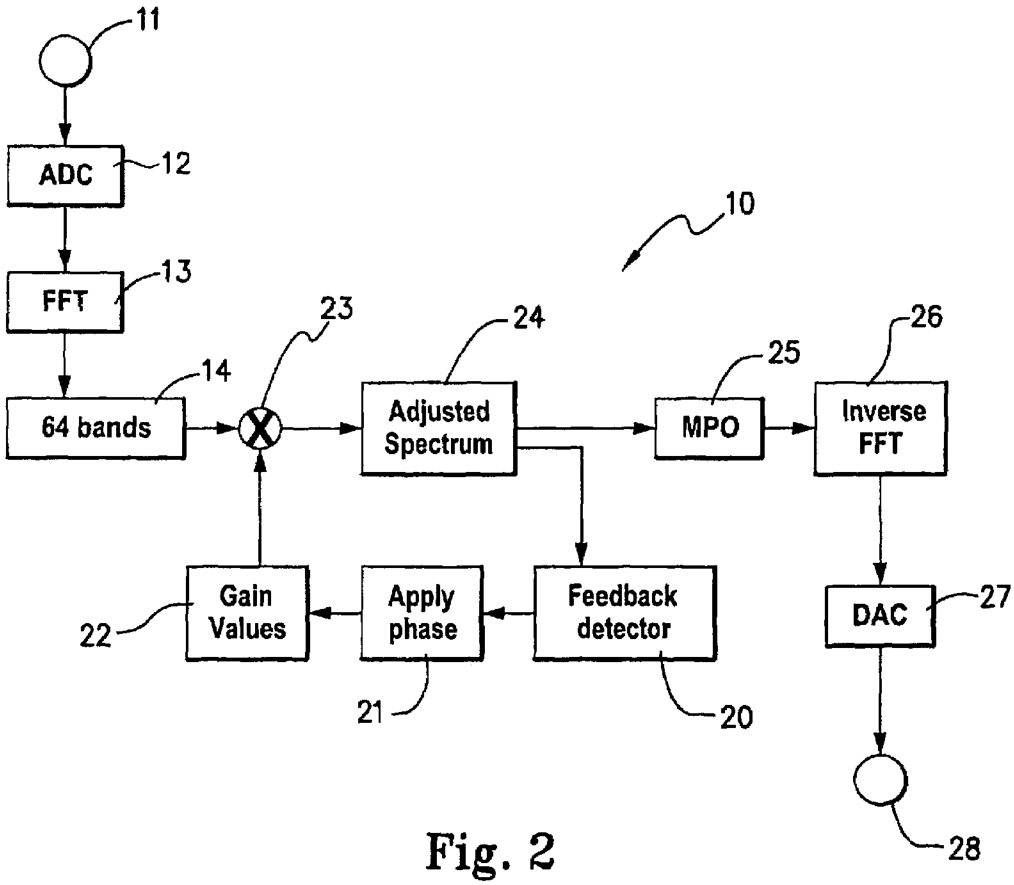
FIG. 2 is a block diagram of an apparatus according to the present invention.

An acoustic system 10 in accordance with the invention, such as a hearing aid, is schematically depicted in FIG. 2. A microphone 11 converts an acoustic signal, such as the speech, into an analogue electrical signal proportional to the acoustic signal, which signal is then converted by an AID converter 12 into a digital signal. The output of A/D converter 12 is connected to the input of a Discrete Fourier Transform (DFT) unit-such as a Fast Fourier Transform (FFT) unit 13—for analysing the frequency components of the signal, whilst unit 14 enables analysis of 64 frequency bands across the spectrum of the signal. A suitable unit is the Toccata Plus integrated circuit designed and developed by the Dspfactory, operating with 16 kHz sampling rate and using 128 point windows of 8 millisecond duration with 50% overlap to yield 64 linearly spaced frequency bands at 125 Hz intervals from 0 to 8000 Hz. Module 20 is a feedback detector arranged to monitor the phase and amplitude of the signal in each frequency band in the spectrum (adjusted if appropriate, as explained further below) during successive sampling windows at short intervals, such as successive 8 millisecond windows with 50% overlap, calculated every 4 milliseconds. The apparatus includes a counter for each frequency band, which can be incremented or reset at each successive time window.

For each time window, the measured phase from the previous window is subtracted from the phase in the current window to calculate the change in phase at a particular frequency band. This change in phase is compared to the previous change in phase. If the values are within a defined variation (ie the change in the phase change is within the threshold) then the counter is incremented, otherwise the counter is reset. Further, the amplitude in the current window is compared with the amplitude in the previous window. If the current amplitude is less than the previous amplitude, then the counter is reset. The feedback detector is programmed to respond-by triggering feedback suppression-to the counter reaching a value M. The present invention contemplates that either the change in phase change criterion (counter reaches $M_p$) or the change in amplitude criterion (counter reaches $M_a$) may be considered for suppression triggering, or both.

Figure 3:
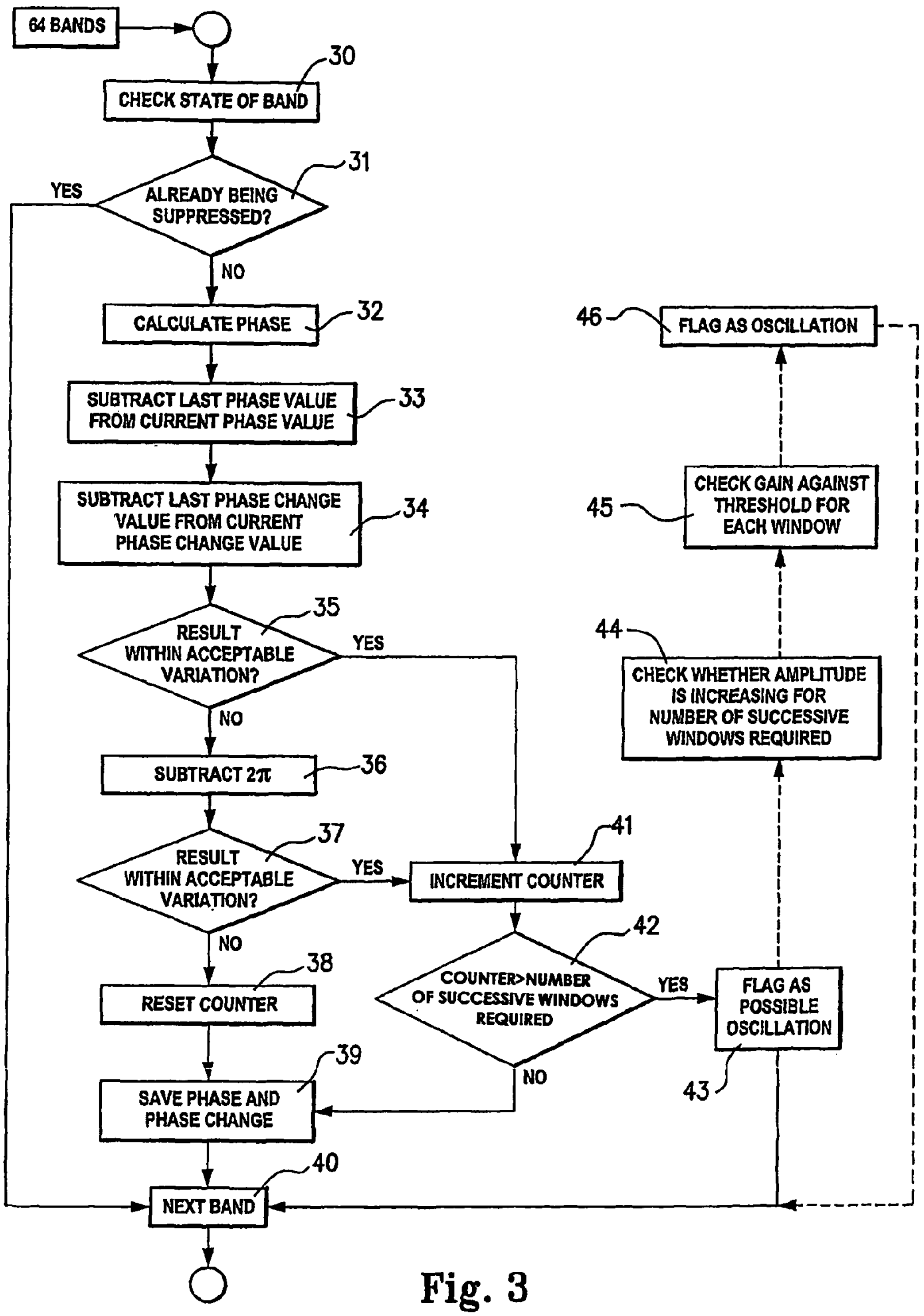
FIG. 3 is a flow diagram illustrating the logic and process of feedback detection.

The example represented in FIG. 3 illustrates, for a time window, the process of detection using the change in phase change criterion. For each of the 64 bands, the state of the band is determined (30). If that band is already being suppressed (31), no calculations are performed. Otherwise, the phase is calculated (32), and the previous phase value calculated for that band (which value has been stored-see below) is subtracted from the current phase value (33) to provide a current value of phase change. The next step (34) is to subtract the previous phase change value from the current phase change value, to output a value of change of phase change. This value is then checked (35) and (37), and if it is within a certain prescribed threshold for phase change variation, the counter is incremented by 1 (41). The subtraction of 27π radians (36) and second check (37) ensure that output is dependent on the magnitude of the change of phase change, irrespective of whether the change has increased or decreased. If the value is not within the threshold, the counter is reset to 0 (38), the current phase and phase change value is saved (39), and the next band is selected (40).

The process described above, involving the step of subtracting 2π radians from the value of the change in phase change and re-checking whether the result is within the prescribed threshold (36, 37), can be replaced by an alternative technique. Instead, the full range of the signed fixed-point numbers can be used to represent the angular phase change from −π to +π, meaning that when successive phase change values are subtracted, the result is also in the range −π to +π. This is a standard calculation technique and will not be further described here.

If the counter has been incremented (41), a check is made to determine if it has reached a value $M_p$ (42), thereby indicating an oscillation has been detected (43) and flagging that band for suppression (see below). If not, the current phase and phase change values are saved (39), and the next band is selected (40). It is to be noted that the bands can be checked in parallel or sequentially within each time window.

If the signal in each frequency band is also to be checked for increasing amplitude, the amplitude is monitored from one time window to the next and, if it is increasing over the prescribed number $M_a$ of successive windows, this measure can be applied in determining whether an oscillation is present in the signal in that frequency band (reference 44 in FIG. 3).

In simulations carried out by the inventors, where both criteria for detection have been employed, $M_a$=$M_p$=12 gives good performance. Using $M_a$=$M_p$ simplifies the detection apparatus and method, as the process can then readily be implemented using a common counter. If only one criterion is to be employed in detecting feedback, the $M_a$ or $M_p$ value may be increased to avoid false triggering of feedback suppression.

Once the counter for any frequency band exceeds the required values of $M_a$ and/or $M_p$, this frequency band is deemed to be in oscillation, and an oscillation suppression algorithm is implemented (in this example, an 'apply phase' module 21 is triggered—see FIG. 2).

Apply phase module 21 generates a complex number with random phase and amplitude 1.0 for each window, and multiplies the real gain value at module 22 for the frequency band by this complex number before the gain is applied to the signal via gain unit 23 to provide an adjusted spectrum 24. The loop illustrated in FIG. 2 indicates that the phase of the gain multipliers depends on the apply phase unit, which operates in accordance with the output of the feedback detector unit. Apply phase module 21 continues to apply random phase to the gain for a prescribed length of time (for example, around 8 s), to allow the conditions which created the feedback path to change.

Figure 4:
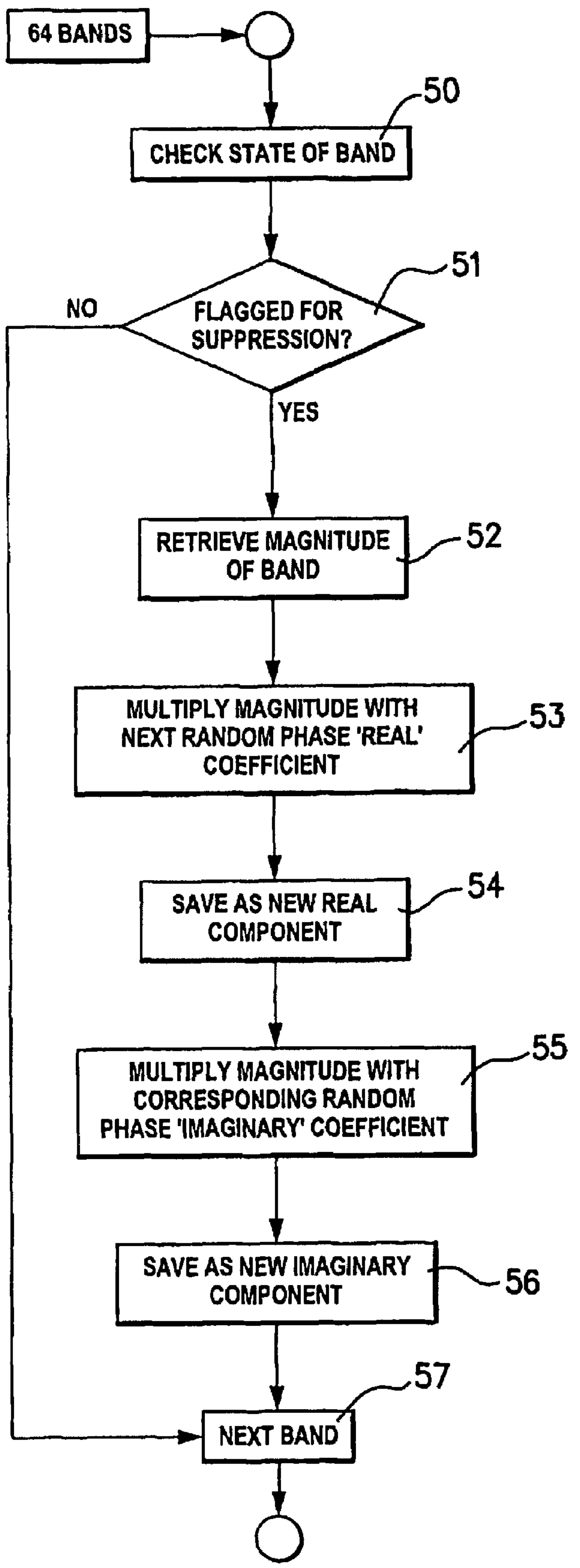
FIG. 4 is a flow diagram illustrating the logic and process of feedback suppression.
Figure 5:
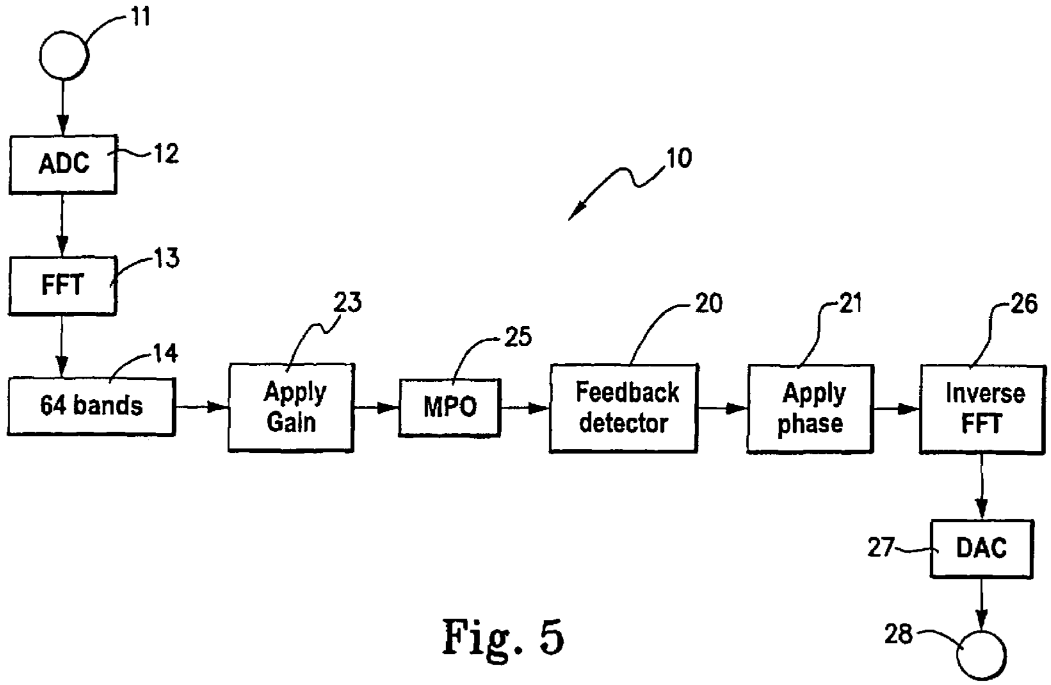
FIGS. 5 and 6 are block diagrams of alternative architectures of apparatus according to the invention.
Figure 6:
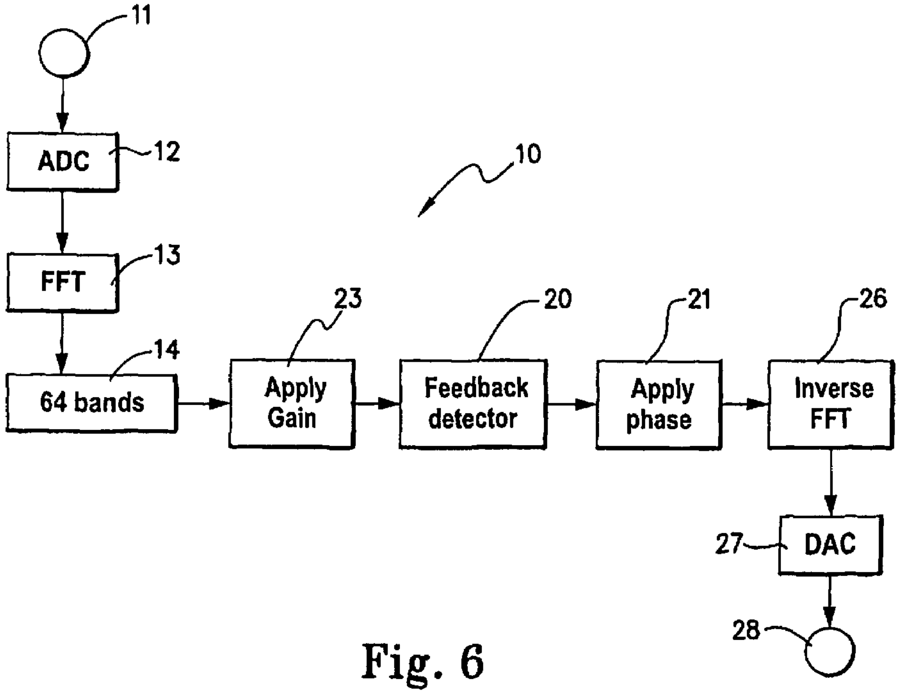

The example represented in FIG. 4 illustrates the process of suppression for a time window, appropriate for the example embodiments illustrated in FIGS. 5 and 6. Firstly, the state of a selected band is checked (50), to determine whether it is flagged for suppression (51). If not, the next band is selected (57). If it is flagged for suppression, the magnitude of the signal at that band is obtained (52) and multiplied by the real part of the generated random complex number (53), the resulting new real component being saved (54). Further, the magnitude of the signal is multiplied by the corresponding imaginary part of the generated random complex number (55), and the resulting new imaginary component saved (56).

The signal passes through MPO unit (Maximum Power Output) 25 (see FIG. 2), and is then reconverted into a time domain waveform by inverse FFT module 26. A D/A converter 27 then converts the digital signal to an electrical analogue signal before supplying it to the hearing aid output terminal to drive speaker 28.

It is to be noted that the 'magnitude of the signal' in a band referred to above in the context of FIG. 4 may be the output spectrum value (for the embodiments shown in FIGS. 5 and 6), or may be the gain value (for the embodiment shown in FIG. 2), and the invention may be implemented using either approach, the selection depending at least in part on the hardware employed for the processing. In the alternative architectures of FIGS. 5 and 6 the random phase is applied to the output spectrum rather than to the gains, in both embodiments the gain values are applied to the signal by gain unit 23 before feedback detector 20. In FIG. 6, MPO unit 25 is omitted, to illustrate that the invention can be implemented without such a component.

As will be evident to the skilled reader, it is not necessary to apply feedback detector 20 and oscillation suppression module 21 together. An alternative form of feedback suppression, such as application of a notch filter, may be applied to a signal in which feedback oscillation has been identified by feedback detector 20. Other types of feedback suppression which might be employed include gain attenuation at the frequency band in question, applying a time varying phase change, or subtraction of the signal at the frequency band in question.

It has been found in simulations carried out by the inventors that application of both feedback detector 20, combining the monitoring of both phase change and amplitude, along with the application of apply phase module 21, can result in suppression of all feedback oscillation in 60-100 milliseconds.

As the skilled reader will readily recognise, the method and apparatus of the present invention may be used in combination with other compatible signal processing techniques. For example, the present inventors have successfully incorporated an adaptive dynamic range optimisation (ADRO™) sound processor, of the sort described in International Patent Application WO-00/47014, into a system employing the feedback detection approach of the present invention.

In a system with adaptive gain (such as the ADRO™ processing strategy), feedback is more likely to occur when gains are high. In one form of the present invention, a further criterion is considered by the feedback detection algorithm, namely, for each of the 64 frequency bands, a comparison of the gain in each time window with a prescribed threshold level. This step is schematically illustrated by reference 45 in FIG. 3, as a factor in determining whether oscillation is present in the signal (46) in the relevant frequency band. In this approach, if both the signal phase criterion (described above) and the gain criterion are satisfied, then it is concluded that feedback is occurring, and feedback suppression is triggered.

This technique has the advantage that the risk of false triggering is reduced. In addition, as this method ensures that feedback will only be detected when gain values are relatively high, application of a gain reduction suppression technique to suppress the feedback will not reduce the gain to an undesirably low level.

In one implementation embodiment, when employed in combination with an adaptive gain system such as ADRO™, the gain threshold is defined as a fixed number of dB below the maximum limit placed on the gain by the adaptive gain system. This approach can also be taken in other nonlinear or adaptive systems that employ variable gain, such as in so-called 'compression' systems which apply lower gains to loud input signals and higher gains to softer input signals.

The present invention has been described above with reference to an implementation providing real-time feedback detection (eg in use by a hearing aid wearer), in order to trigger real-time suppression measures. However, as the skilled reader will appreciate, the oscillation detection technique of the invention can also be used for feedback management, applied at a setup (or adjustment) phase, in order to set parameters of the signal processing system. The feedback management step is therefore undertaken only once during the setup phase of the amplifying system, or during any subsequent resetting of the apparatus.

In this feedback management process, the feedback detection technique is used to detect the onset of feedback while amplifier gain limits are adjusted during the setup phase.

This serves to remove steady state feedback, whilst the real-time feedback detection/suppression system then operates during normal use of the apparatus to reduce the occurrence of transitory feedback caused by changing environmental conditions.

Modifications and improvements to the invention will be readily apparent to those skilled in the art. Such modifications and improvements are intended to be within the scope of this invention. For example, in accordance with the invention, the signal spectrum may be split into a plurality of discrete frequency bands, or alternatively neighbouring bands may overlap.

The word 'comprising' and forms of the word 'comprising' as used in this description and in the claims does not limit the invention claimed to exclude any variants or additions.

REFERENCES

[1] D K. Bustamante, T L. Worrall, and M J. Williamson, "*Measurement and Adaptive Suppression of acoustic feedback in hearing aids*," in 1989 International Conference on Acoustics, Speech and Signal Processing, 1989.

[2] Rongtai Wang and Rameslh Harjani, "*Acoustic Feedback Cancellation in Hearing Aids*", in Proceedings of the IEEE International Conference oil Acoustics, Speech and Signal Processing, pp. 137-140, 1993.

[3] Rongtai Wang and Ramesh Harjani, "*The Suppression of Acoustic Oscillation in Hearing Aids Using Minimum*

*Phase Techniques*", in Proceedings of the IEEE International Symposium on Circuits and Systems, pp. 818-821, 1993.

[4] D. Egolf "*Acoustic feedback suppression in hearing aids*," tech. rep., VA Medical Center, 1984.

[5] D. Egolf "*Review of acoustic feedback literature from a control systems point of view*," in Amplification for hearing impaired research needs, monographs in contemporary audiology, 1982.

[6] O. Dyrlund, N. Bisgaard, "*Acoustical feedback margin improvements in hearing instruments using a prototype DFS system*." Scand Audiol. 1991; 20: pp 49-53.

[7] L. Henningsen, O. Dyrlund, N. Bisgaard, B. Brink "*Digital Feedback Suppression*" Scand. Audiol. 1994; 2. pp 117-122.

[8] J Hellgren, T Lluner, S. Arlinger, "*System identification of feedback in hearing aids*," in J. Acoust. Soc. America 1999; 8. pp 333-336.

[9] F. Kuk, C. Ludvigsen, T Kaulberg, "*Uniderstanding feedback and digital feedback cancellation strategies*," in The Hearing Review, February 2002; Volume 9, number 2. pp 36-49.

[10] F Kuk, C. Ludvigsen, "*Understanding feedback and digital feedback cancellation strategies*" in The Hearing Review, April 2002; Volume 9, Number 4.

The invention claimed is:

1. A method of identifying oscillation in a signal due to feedback, the method comprising:

converting the signal at each of a series of successive time windows into the frequency domain;

calculating for each of a plurality of frequency bands the change in signal phase from a time window to a subsequent time window, and comparing the change in signal phase with a previous phase change to provide a measure of the change in phase change; and comparing, for some or all of said frequency bands, the results of the calculation to one or more defined criteria to provide a measure of whether oscillation due to feedback is present in the signal.

2. The method of claim 1, further comprising calculating, for some or all of said frequency bands, the change in signal amplitude from a time window to a subsequent time window, and comparing the result of the further calculation to one or more further defined criteria, to provide a further measure as to whether oscillation due to feedback is present in the signal.

3. The method of claim 2, in which for each frequency band, for each time window the amplitude from at least one previous window is compared with that of the current window to calculate a change in amplitude.

4. The method of claim 3, in which a counter is employed, the counter being incremented if the value of the amplitude change is greater than zero, the counter being reset if it is not, the further measure of whether oscillation due to feedback is present in the signal being provided by the counter reaching a value $M_a$.

5. The method of claim 1, in which the signal conversion into the frequency domain is carried out by way of a Fast Fourier Transform technique.

6. The method of claim 1, in which the number of frequency bands is around 64.

7. The method of claim 1, which said successive time windows are in the range of 1 to 100 ms.

8. The method of claim 1 in which the signal phase change is calculated from each time window to the next successive time window, to provide a continuous monitoring of the change in phase change in that frequency band.

9. The method of claim 1, in which a counter is employed, the counter being incremented if the value of the change in phase change is within a prescribed limit, the counter being reset if it is not, the measure of whether oscillation due to feedback is present in the signal being provided by the counter reaching a value $M_p$.

10. The method of claim 9 together with the method of claim 10, wherein $M_p=M_a$.

11. The method of claim 1, in which, on determination that oscillation due to feedback is present in the signal, a selected method for suppressing oscillation is applied to the signal in that frequency band.

12. The method of claim 11 in which the suppression technique includes the step of adding a random phase to the signal in at least one of said frequency bands for a prescribed period of time.

13. The method of claim 11 in which the suppression technique is selected from the group of: applying a phase shift; applying a notch filter; subtracting a signal from the input signal; and applying a gain attenuation.

14. The method of claim 1, applied to a feedback management system for a signal processing apparatus incorporating selectively adjustable or settable signal gain values, whereby the comparing, calculating and comparing are carried out as part of a setup phase, in order to set or adjust said gain values.

15. A method for identifying oscillation in a signal due to feedback for use in a system involving deriving gain values for said frequency bands in accordance with a specified signal processing algorithm, the method comprising:

converting the signal at each of a series of successive time windows into the frequency domain:

calculating for each of a plurality of frequency bands the change in signal phase from a time window to a subsequent time window;

comparing, for some of all said frequency bands, the results of the calculation to one or more defined criteria to provide a measure of whether oscillation due to feedback is present in the signal; and comparing, only for frequency bands and in time windows in which said one or more defined criteria is/are met, the derived gain with a prescribed gain limit, in order to provide a further measure as to whether oscillation due to feedback is present in the signal.

16. Apparatus for identifying oscillation in a signal in a system having an input transducer and an output transducer, comprising:

means for converting the signal into the frequency domain;

means for analysing the converted signal at each of a succession of time windows over a number of frequency bands, to determine the amplitude and phase of the signal in each frequency band;

means for calculating the change in signal phase for each frequency band from a time window to a subsequent time window;

means for comparing the change in phase with one or more defined criteria to provide a measure of whether oscillation is present in the signal, and means for comparing, for each frequency band and for each time window, the signal phase from one or more previous time windows with that from the current window to calculate a change of phase, and means for comparing this change of phase with a previous phase change to provide a measure of the change in phase change.

17. The apparatus of claim 16, including means for further calculating, for some or all of said frequency bands, the change in signal amplitude from one time window to a subsequent time window, and means for comparing the result of the further calculation step to one or more further defined criteria, to provide a further measure as to whether oscillation is present in the signal.

18. The apparatus of claim 17, in which the means for further calculating comprise means for comparing, for each frequency band and for each time window, the amplitude from at least one previous window with that of the current window, to calculate a change in amplitude.

19. The apparatus of claim 18, including a counter arranged to be incremented if the value of the amplitude change is greater than zero, and to be reset if it is not, the further measure of whether oscillation is present in the signal being provided by the counter reaching a value $M_a$.

20. The apparatus of claim 16, wherein the converting means comprises a Fast Fourier Transform (FFT) unit.

21. The apparatus of claim 16 wherein said means for comparing is arranged to calculate the signal phase change from each time window to the next successive time window, to provide continuous monitoring of the change in phase change in that frequency band.

22. The apparatus of claim 16 including a counter arranged to be incremented if the value of the change in phase change is within a prescribed limit, and to be reset if it is not, the measure of whether oscillation is present in the signal being provided by the counter reaching a value $M_p$.

23. The apparatus of claim 16, in combination with a means for suppressing oscillation, the suppressing means arranged to be triggered in accordance with the measure of whether oscillation is present in the signal.

24. A feedback management system for a signal processing apparatus incorporating selectively adjustable or settable signal gain values, including the apparatus of claim 16, the system including means for setting or adjusting said gain values in accordance with a measure of whether oscillation is present in the signal.

25. Apparatus for identifying oscillation in a signal in a system having an input transducer and an output transducer, comprising;

means for converting the signal into the frequency domain;

means for analysing the converted signal at each of a succession of time windows over a number of frequency bands, to determine the amplitude and phase of the signal in each frequency band, means for calculating the change in signal phase for each frequency band from a time window to subsequent time window;

means for comparing the change in phase with one or more defined criteria to provide a measure of whether oscillation is present in the signal; and means for reconverting the signal to a waveform signal to be fed to the output transducer.

26. Apparatus for identifying oscillation in a signal in a system having an input transducer and an output transducer, in combination with a system for deriving gain values for said frequency bands in accordance with a specified signal processing algorithm, the apparatus comprising:

means for converting the signal into the frequency domain:

means for analyising the converted signal at each of a succession of time windows over a number of frequency bands, to determine the amplitude and phase of the signal in each frequency band;

means for calculating the change in signal phase for each frequency band from a time window to a subsequent time window, means for comparing the change in phase with one or more defined criteria to provide a measure of whether oscillation is present in the signal; and means for comparing, only frequency bands and in time windows in which said one or more defined criteria is are met, the derived gain with a prescribed gain limit, to provide a further measure as to whether oscillation due to feedback is present in the signal.

* * * * *